United States Patent
Steffka et al.

(10) Patent No.: US 8,624,427 B2
(45) Date of Patent: Jan. 7, 2014

(54) VEHICULAR ELECTRICAL SYSTEMS, AUTOMOTIVE ELECTRICAL SYSTEMS, AND AUTOMOTIVE PROPULSION SYSTEMS

(75) Inventors: Mark Andrew Steffka, Canton, MI (US); William C. Goodwin, Brighton, MI (US); Jeremy B. Campbell, Torrance, CA (US)

(73) Assignee: GM Global Technology Operations, LLC, Detroit, MI (US)

( * ) Notice: Subject to any disclaimer, the term of this patent is extended or adjusted under 35 U.S.C. 154(b) by 366 days.

(21) Appl. No.: 12/765,519

(22) Filed: Apr. 22, 2010

(65) Prior Publication Data

US 2011/0260530 A1 Oct. 27, 2011

(51) Int. Cl.
*B60L 1/00* (2006.01)
*B60L 3/00* (2006.01)
*H02G 3/00* (2006.01)

(52) U.S. Cl.
USPC .......................................... 307/10.1

(58) Field of Classification Search
USPC ............ 307/10.1; 174/32, 350, 105 R, 105 B
See application file for complete search history.

(56) References Cited

U.S. PATENT DOCUMENTS

| | | | |
|---|---|---|---|
| 4,464,583 A | 8/1984 | Holmgren | |
| 6,249,060 B1 * | 6/2001 | Osha | 307/10.1 |
| 7,332,676 B2 * | 2/2008 | Sparrowhawk | 174/102 R |
| 7,525,040 B2 | 4/2009 | Schoffner | |
| 7,700,879 B2 * | 4/2010 | Watanabe | 174/102 R |
| 2007/0037419 A1 | 2/2007 | Sparrowhawk | |
| 2010/0000780 A1 | 1/2010 | Zhu et al. | |

FOREIGN PATENT DOCUMENTS

| | | |
|---|---|---|
| DE | 1440919 A1 | 1/1969 |
| DE | 102008039284 A1 | 2/2010 |
| WO | 2010003215 A1 | 1/2010 |

OTHER PUBLICATIONS

Ott, H. "Cabling: Shield Terminations, Grounding of Cable Shields," Electromagnetic Compatibility Engineering, 2009, pp. 88-91.
The German Patent and Trade Mark Office, Office Action for German Patent Application No. 10 2011 004 457.4, mailed Sep. 30, 2013.

\* cited by examiner

*Primary Examiner* — Carlos Amaya
(74) *Attorney, Agent, or Firm* — Ingrassia Fisher & Lorenz, P.C.

(57) ABSTRACT

Vehicular electrical systems are provided. The vehicular electrical systems include a source device including an electrical component, a load device, and a cable assembly interconnecting the source device and the load device. The cable assembly includes a conductive core electrically interconnecting the electrical component and the load device, a conductive shield surrounding and being electrically insulated from the conductive core, the conductive shield having a first portion and a second portion, and an insulating body positioned between the first and second portions of the conductive shield such that the first and second portions of the conductive shield are electrically separated.

20 Claims, 4 Drawing Sheets

VEHICULAR ELECTRICAL SYSTEMS, AUTOMOTIVE ELECTRICAL SYSTEMS, AND AUTOMOTIVE PROPULSION SYSTEMS

TECHNICAL FIELD

The present invention generally relates to vehicular electrical systems. More specifically, the present invention relates to vehicular electrical systems with a split shield cable assembly.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel (or propulsion) vehicles that utilize voltage supplies, such as hybrid and battery electric vehicles. Such alternative fuel vehicles typically use one or more electric motors, often powered by batteries perhaps in combination with another actuator to drive the wheels.

Such vehicles often use two separate voltage sources, such as a battery and a fuel cell, to power the electric motors that drive the wheels. Power electronics (or power electronics systems), such as direct current-to-direct current (DC/DC) converters, are typically used to manage and transfer the power from the two voltage sources. Also, due to the fact that alternative fuel automobiles typically include only direct current (DC) power supplies, direct current-to-alternating current (DC/AC) inverters (or power inverters) are also provided to convert the DC power to alternating current (AC) power, which is generally required by the motors.

The electrical connections made between the various devices (e.g., inverters, converters, batteries, motors, etc.) are typically made using high voltage coaxial cabling that includes a center conductor for the primary current and a surrounding conductive shield (e.g., a wire braid) for electric field suppression. The magnetic field generated by the current flowing through the center conductor can result in substantial current flow through the conductive shield. This current can lead to significant power loss due to the impedance in the shield and the current along the shield generated from double-ended galvanic connections on both ends of the cable.

Accordingly, it is desirable to provide an improved vehicular electrical system that reduces such current flow through the shield. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In an embodiment, by way of example only, a vehicular electrical system is provided. The vehicular electrical system includes a source device including an electrical component, a load device, and a cable assembly interconnecting the source device and the load device. The cable assembly includes a conductive core electrically interconnecting the electrical component and the load device, a conductive shield surrounding and being electrically insulated from the conductive core, the conductive shield having a first portion and a second portion, and an insulating body positioned between the first and second portions of the conductive shield such that the first and second portions of the conductive shield are electrically separated.

In another embodiment, by way of example only, an automotive electrical system is provided. The automotive propulsion system includes a source device including a plurality of power switching components, a load device, and a plurality of cable assemblies interconnecting the source device and the load device. Each of the plurality of cable assemblies includes a conductive core electrically interconnecting at least one of the power switching components and the load device, a conductive shield surrounding the conductive core, the conductive shield having a first portion and a second portion, an insulating layer surrounding the conductive core and being positioned between the conductive core and the conductive shield such that the conductive shield is electrically insulated from the conductive core, and an insulating body positioned between the first and second portions of the conductive shield such that the first and second portions of the conductive shield are electrically separated.

In still another embodiment, by way of example only, an automotive propulsion system is provided. The automotive propulsion system includes a source device comprising a plurality of power switching components, a load device, and a plurality of cable assemblies interconnecting the source device and the load device. Each of the plurality of cable assemblies includes a conductive core electrically interconnecting at least one of the power switching components and the load device, a conductive shield surrounding the conductive core, the conductive shield having a first portion and a second portion, an insulating layer surrounding the conductive core and being positioned between the conductive core and the conductive shield such that the conductive shield is electrically insulated from the conductive core, and an insulating body positioned between the first and second portions of the conductive shield such that the first and second portions of the conductive shield are electrically separated.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-7 are merely illustrative and may not be drawn to scale.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

FIG. 1 to FIG. 8 illustrate a vehicular electrical system. The vehicular electrical system includes a source device (e.g., an inverter or a converter) including an electrical component (e.g., a switch), a load device (e.g., a motor or a battery), and a cable assembly interconnecting the source device and the load device. The cable assembly includes a conductive core electrically interconnecting the electrical component and the load device, a conductive shield surrounding and being electrically insulated from the conductive core, the conductive shield having a first portion and a second portion, and an insulating body positioned between the first and second portions of the conductive shield such that the first and second portions of the conductive shield are electrically separated. In an embodiment, the system is an automotive propulsion system.

Figure 1:
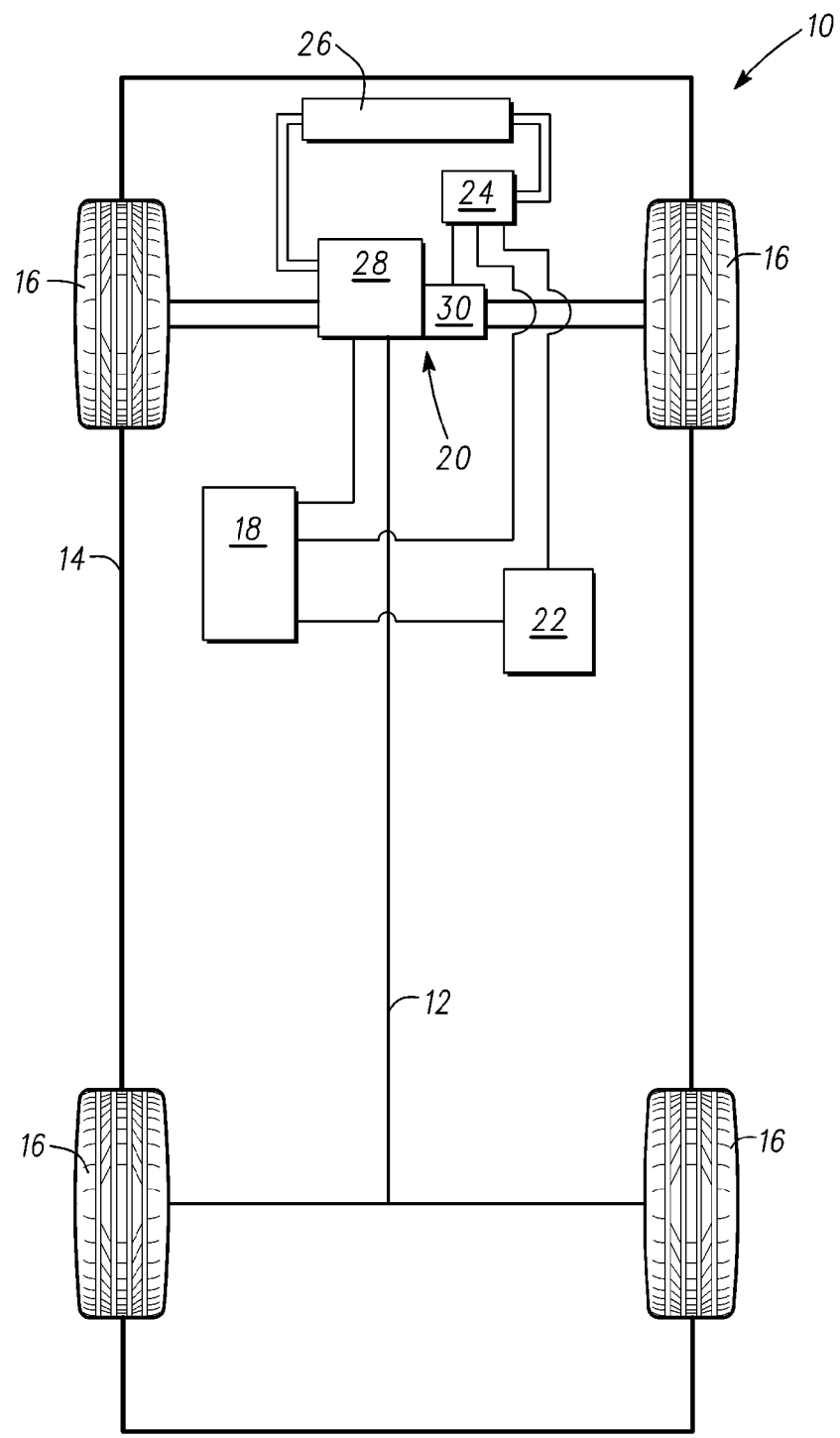
FIG. 1 is a schematic view of an exemplary automobile according to an embodiment.

FIG. 1 is a schematic view a vehicle (or "automobile" or automotive propulsion system) 10, according to an embodiment. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

The automobile 10 in FIG. 1 is an HEV, and further includes an actuator assembly 20, a battery (or a DC power or voltage supply) 22, a power electronics assembly (e.g., an inverter or inverter assembly) 24, and a radiator 26. The actuator assembly 20 includes a combustion engine 28 and an electric motor/generator (or motor) 30.

Still referring to FIG. 1, the combustion engine 28 and/or the electric motor 30 are integrated such that one or both are mechanically coupled to at least some of the wheels 16 through one or more drive shafts 32. In an embodiment, the automobile 10 is a "series HEV," in which the combustion engine 28 is not directly coupled to the transmission, but coupled to a generator (not shown), which is used to power the electric motor 30. In another embodiment, the automobile 10 is a "parallel HEV," in which the combustion engine 28 is directly coupled to the transmission by, for example, having the rotor of the electric motor 30 rotationally coupled to the drive shaft of the combustion engine 28.

The radiator 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 28 and the inverter 24. Referring again to FIG. 1, in the depicted embodiment, the inverter 24 receives and shares coolant with the electric motor 30. However, other embodiments may use separate coolants for the inverter 24 and the electric motor 30. The radiator 26 may be similarly connected to the inverter 24 and/or the electric motor 30.

The electronic control system 18 is in operable communication with the actuator assembly 20, the high voltage battery 22, and the inverter 24. Although not shown in detail, the electronic control system 18 includes various sensors and automotive control modules, or electronic control units (ECUs), such as an inverter control module, a motor controller, and a vehicle controller, and at least one processor (or processing system) and/or a memory having instructions stored thereon (or in another computer-readable medium) for carrying out the processes and methods as described below.

Figure 2:
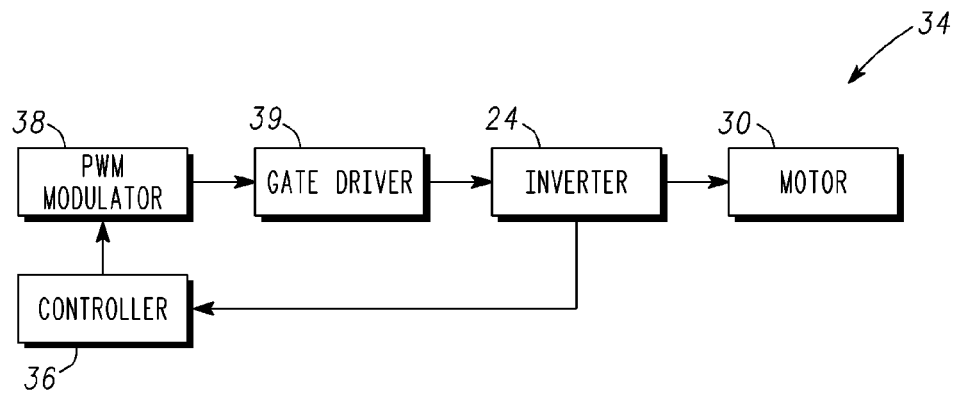
FIG. 2 is a block diagram of an inverter control system within the automobile of FIG. 1, according to an embodiment.

Referring to FIG. 2, an inverter control system (or electric drive system) 34, in accordance with an exemplary embodiment of the present invention, is shown. The inverter control system 34 includes a controller (or processor) 36 in operable communication with a Pulse Width Modulation (PWM) modulator 38 (or a pulse width modulator) and the inverter 24 (at an output thereof). The PWM modulator 38 is coupled to a gate driver 39, which in turn has an output coupled to an input of the inverter 24. The inverter 24 has a second output coupled to the motor 30. The controller 36 and the PWM modulator 38 may be integral with the electronic control system 18 shown in FIG. 1.

Figure 3:
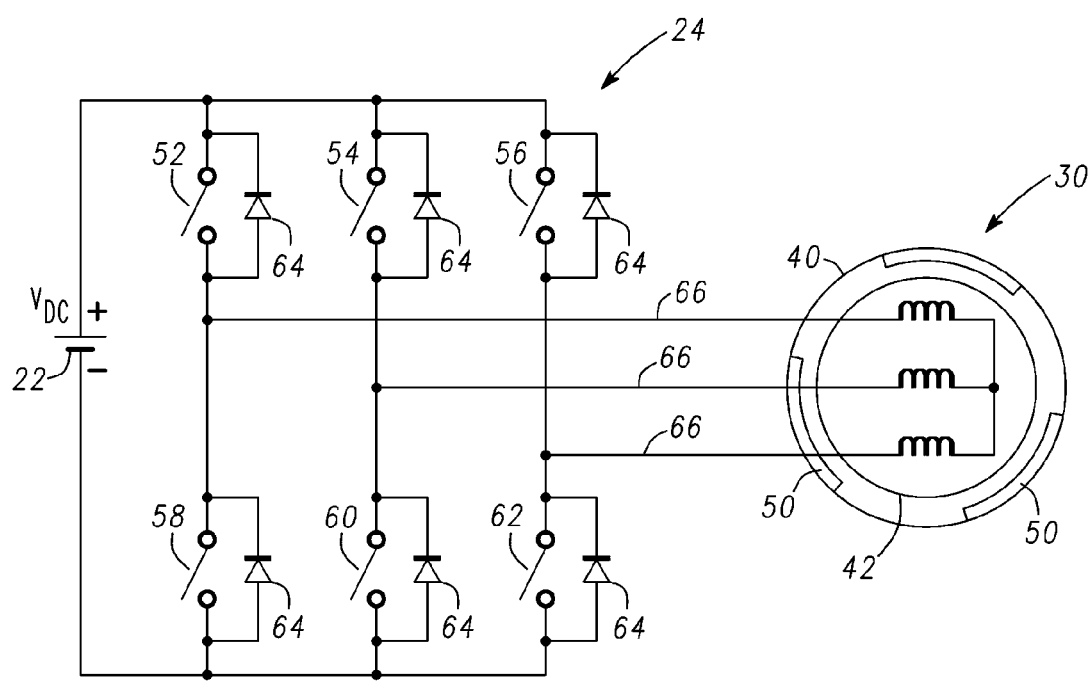
FIG. 3 is a schematic of a power inverter, a voltage supply, and an electric motor within the automobile of FIG. 1, according to an embodiment.

FIG. 3 schematically illustrates the battery (and/or DC voltage source) 22, the inverter 24 (or power converter), and the motor 30 of FIGS. 1 and 2 in greater detail. In the depicted embodiment, the inverter 24 includes a three-phase circuit coupled to the motor 30. More specifically, the inverter 24 includes a switch network having a first input coupled to the battery 22 (i.e., a voltage source ($V_{DC}$)) and an output coupled to the motor 30. Although a single voltage source is shown, a distributed DC link with two or more series sources may be used.

As will be appreciated by one skilled in the art, the electric motor 30, in one embodiment, is a permanent magnet electric motor and includes a stator assembly 40 (including conductive coils or windings) and a rotor assembly 42 (including a ferromagnetic core and/or magnets), as well as a transmission and a cooling fluid (not shown). The stator assembly 40 includes a plurality (e.g., three) conductive coils or windings 44, 46, and 48, each of which is associated with one of three phases of the electric motor 30, as is commonly understood. The rotor assembly 42 includes a plurality of magnets 50 and is rotatably coupled to the stator assembly 40, as is commonly understood. The magnets 50 may include multiple (e.g., sixteen) electromagnetic poles, as is commonly understood. It should be understood that the description provided above is intended only as an example of one type of electric motor that may be used.

The switch network comprises three pairs of series power switching devices (or switches or components) with antiparallel diodes (i.e., antiparallel to each switch) corresponding to each of the phases of the motor 30. Each of the pairs of series switches comprises a first switch, or transistor, (i.e., a "high" switch) 52, 54, and 56 having a first terminal coupled to a positive electrode of the voltage source 22 and a second switch (i.e., a "low" switch) 58, 60, and 62 having a second terminal coupled to a negative electrode of the voltage source 22 and a first terminal coupled to a second terminal of the respective first switch 52, 54, and 56.

As is commonly understood, each of the switches 52-62 may be in the form of individual semiconductor devices such as insulated gate bipolar transistors (IGBTs) within integrated circuits formed on semiconductor (e.g. silicon) substrates (e.g., die). As shown, a diode 64 is connected in an antiparallel configuration (i.e., a "flyback" or "freewheeling" diode) to each of the switches 52-62. As such, each of the switches 52-62 and the respective diode 64 may be understood to form a switch-diode pair or set, six of which are included in the embodiment shown. Although not shown, the inverter 24 may also include current sensors (e.g., Hall Effect sensors) to detect the flow of current through the switches 52-62 and/or the windings 44, 46, and 48.

Still referring to FIG. 3, the windings 44, 46, and 48 of the electric motor 30 are electrically connected to the inverter 24 through three cables (or cable assemblies) 66. More particularly, each of the cables 66 connects one of the windings 44, 46, and 48 to a node between the switches of a respective pair of the switches 52-62 of the inverter 24. That is, in one embodiment, each cable 66 corresponds to one phase of the electric motor 30. As such, it should be understood that different numbers of cables 66 may be used in other embodiments.

Figure 4:
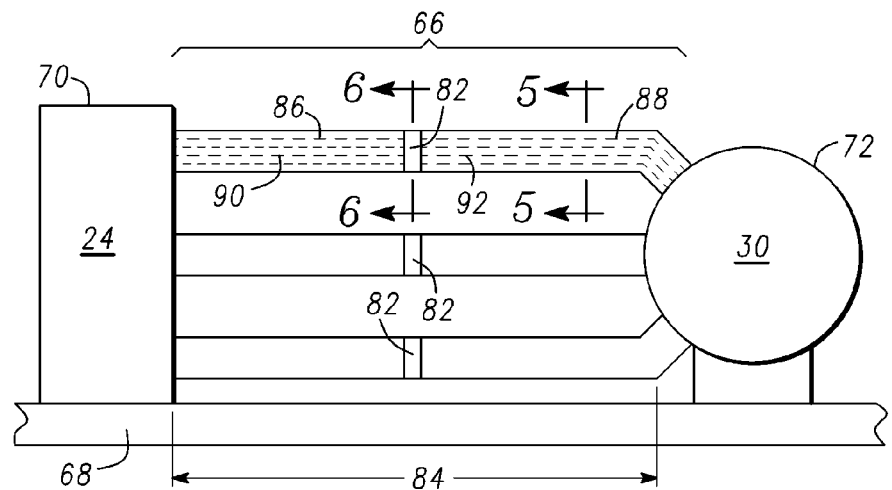
FIG. 4 is a side view of the power inverter and electric motor of FIG. 3, according to an embodiment.

FIG. 4 is a side view of the inverter (i.e., a source device) 24, the electric motor (i.e., a load device) 30, and the cables, or cable assemblies, 66. As shown, the inverter 24 and the electric motor are mounted on, or connected to, a chassis (or frame) 68. In one embodiment, the chassis 68 is made of an electrically conductive material, such as aluminum, copper, steel, or other metal. It should also be noted that in at least one embodiment, the inverter 24 and the electric motor 30 have respective bodies, or casings, 70 and 72, which are also made of a conductive material (e.g., aluminum, steel, or other metal) and are electrically connected to the chassis 68.

Figure 5:
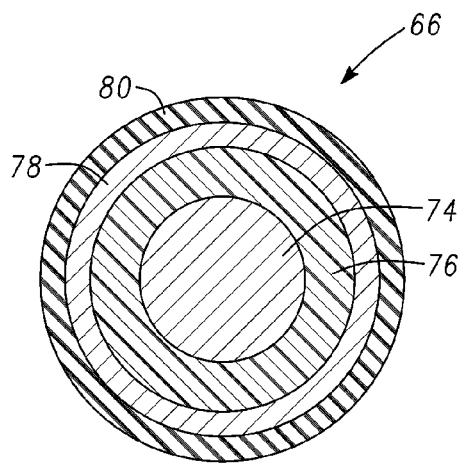
FIG. 5 is a cross-sectional view of a cable assembly in FIG. 4 taken along line 5-5, according to an embodiment.
Figure 6:
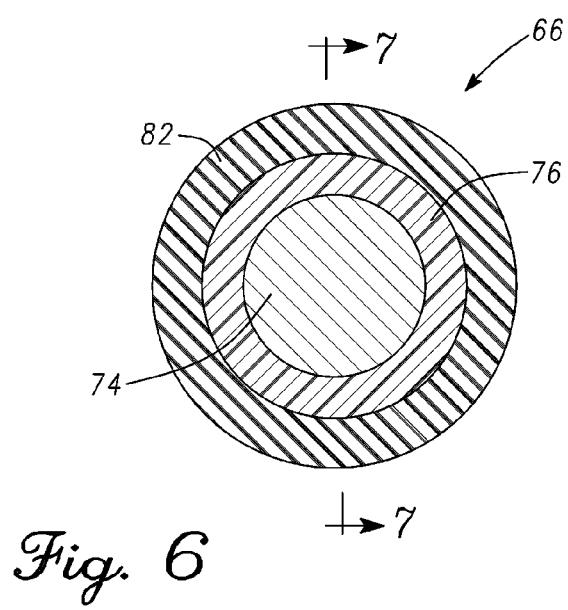
FIG. 6 is a cross-sectional view of the cable assembly of FIG. 4 taken along line 6-6, according to an embodiment.
Figure 7:
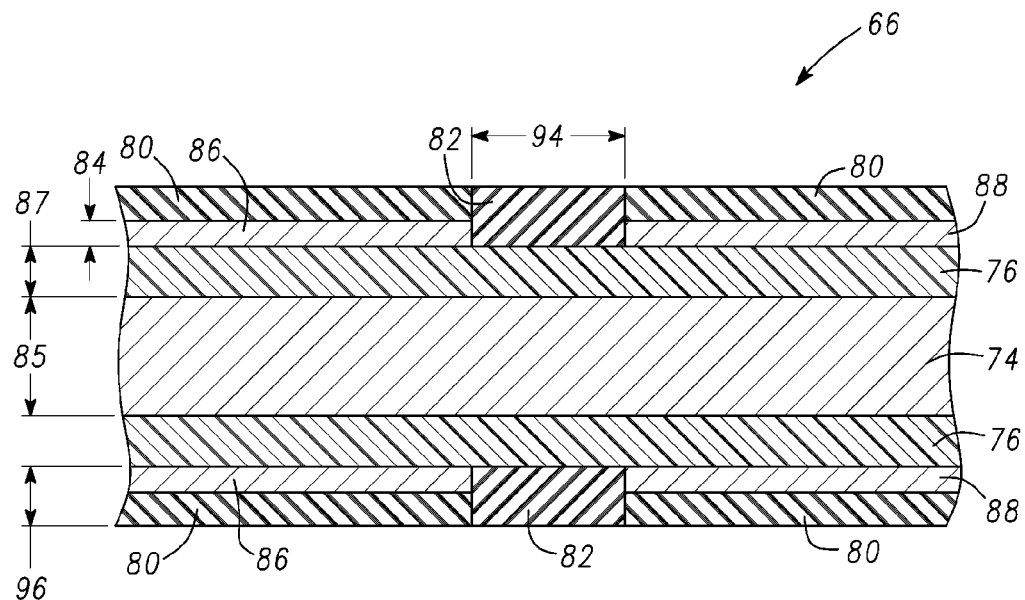
FIG. 7 is a cross-sectional view of the cable assembly of FIG. 6 taken along line 7-7, according to an embodiment.

Referring to FIGS. 5, 6, and 7, in combination with FIG. 4, all of the cable assemblies 66 may be substantially identical. The cable assemblies 66 each include a conductive core 74, an insulating layer 76, a conductive shield 78, an insulating jacket 80, and an insulating body 82. The conductive core 74 is made of a conductive metal, such as copper, and electrically interconnects the respective winding of the motor 30 with the switches 52-62, as indicated in FIG. 3, and thus extends the entirety of a length 84 of the cable assembly 66. In one embodiment, the length 84 of the cable assembly 66 is between 10 centimeters (cm) and 50 cm. In one embodiment, the conductive core 74 has a diameter 85 of between 1 millimeter (mm) and 5 mm. It should be noted that, in at least one embodiment, the length 84 of the cable assembly 66 is less than ¼ of the wavelength(s) associated with the frequency of the current(s) that flow the inverter 24 to the electric motor 30 through the cable assembly 66, as described below.

The insulating layer 76 surrounds and electrically separates (or insulates) the conductive core 74 from the other portions of the cable assembly 66. The insulating layer 76 may be made of a dielectric material, such as a plastic or composite material, and have a thickness 87 of between 0.5 and 3 mm.

The conductive shield 78 surrounds the conductive core 74 and the insulating layer 76, and is electrically insulated from the conductive core 74 by the insulating layer 76. As shown in FIG. 4, the conductive shield 78 includes a first portion 86 and a second portion 88, both of which are approximately half of the length 84 of the cable assembly 66. The first portion 86 of the conductive shield 78 is adjacent to the inverter 24 and electrically connected to the casing 70 of the inverter 24, and may be considered to surround, or cover, a first portion 90 of the conductive core 74. The second portion 88 is adjacent to the electric motor 30 and electrically connected to the casing 72 of the motor 30, and may be considered to surround a second portion 92 of the conductive core 74. In one embodiment, the conductive shield 78 is made of a conductive metal, such as copper, and has a thickness 89 of between 1 mm and 3 mm.

The insulating jacket (or second insulating layer) 80 is made of an insulating material, such as a rubber, and surrounds both portions 86 and 88 of the conductive shield 78.

Referring to FIGS. 4, 6, and 7, the insulating body 82 is ring-shaped and surrounds the conductive core 74 and the insulating layer 76. In the example shown, the insulating body 82 is positioned at a central portion of the cable assembly 66 between the first and second portions 86 and 88 of conductive shield 78. The insulating body 82 is made of a dielectric material, such as a plastic, a composite, or a rubber, such that the first and second portions 86 and 88 of the conductive shield 78 are electrically separated, thus "splitting" the conductive shield 78 (both electrically and mechanically). The insulating body 82 may have a width 94 that extends only a small portion of the length 84 of the cable assembly 66, such as between 1% and 10% of the entire length 84 (e.g., between 0.1 cm and 5 cm). In one embodiment, the insulating layer has a thickness 96 of between 2 mm and 6 mm. In the example shown, the insulating body 82 extends the entire diameter of the cable assembly 66. As such, the insulating jacket 80, like the conductive shield 78 is separated into two portions (not explicitly shown).

Figure 8:
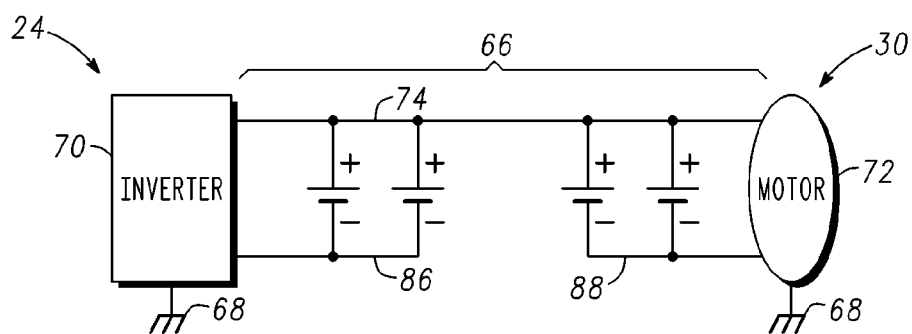
FIG. 8 is a schematic view of the cable assembly, the power inverter, and the electric motor of FIG. 4, according to an embodiment.

FIG. 8 schematically illustrates the casing 70 of the inverter 24, the casing 72 of the electric motor 30, the first and second portions 86 and 88 of the conductive shield 78, and the chassis 68. As shown, the casings 70 and 72 are grounded to the chassis 68, as are the first and second portions 86 and 88 of the conductive shield 78. By including the insulating body 82, the casings 70 and 72 are not electrically interconnected through the conductive shield 78 due to the break between the first and second portions 86 and 88 of the conductive shield 78.

Referring to FIG. 1, during normal operation (i.e., driving), the automobile 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30. As will be appreciated by one skilled in the art, the conversion of DC power to AC power is substantially performed by operating (i.e., repeatedly switching) the transistors within the inverter 24 at an operating (or switching) frequency, such as, for example, 12 kilohertz (kHz).

Referring to FIG. 2, generally, the controller 36 produces a Pulse Width Modulation (PWM) signal for controlling the switching action of the inverter 24. The inverter 24 then converts the PWM signal to a modulated voltage waveform for operating the motor 30. The inverter control system 34 of FIG. 2 consists of multiple operations during normal, or forward, operation including, but not limited to, receiving a torque command, converting the torque command to current commands based on present speed and available voltage, and performing regulation on such current commands. The output of the current regulator (not shown) is the output voltage needed to produce the requested currents. The PWM modulator 38 and the gate driver 39 generate the necessary gate pulses (or duty cycles) which are sent to the inverter 24 to control the electric motor 30 to the desired speed and/or torque.

As will be appreciated by one skilled in the art, the operation of the switches 52-62 (FIG. 3) causes current to flow through the cable assemblies 66 (or the conductive cores 74 thereof) and the windings 44, 46, and 48 in the motor 30. The interaction of this current with the magnetic fields generated by the magnets 50 causes a Lorentz force to be generated, thus causing the rotor 42 to rotate relative to the stator 40.

By electrically "splitting" the conductive shield 78 with the insulating body 82 (i.e., the insulating body 82 electrically separates the first and second portions 86 and 88 of the conductive shield 78) substantially all current flowing through the conductive shield 78 is eliminated. That is, the insulating body 82 prevents magnetic fields generated by the current flowing through the conductive core 74 from inducing current flow through the conductive shield 78. As a result, resistive losses (i.e., Joule heating) and radiated emissions of the system are reduced and overall system efficiency is improved. Additionally, because of the relatively small size of the insulating body 82, the shielding benefits provided by the conductive shield 78 are only negligibly affected, if at all.

Other embodiments may utilize source devices other than DC/AC inverters, such as DC/DC power converters, and load devices other than electric motors, such as batteries (e.g., lithium ion batteries). The system described above may be implemented in systems other than automobiles, such as watercraft and aircraft. The electric motor and the power inverter may have different numbers of phases, such as two or four. Other forms of power sources may be used, such as current sources and loads including diode rectifiers, thyristor converters, fuel cells, inductors, capacitors, and/or any combination thereof. It should be noted that the numerical ranges provided above are intended to serve only as examples and not intended to limit the use of the system described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular electrical system comprising:
a source device comprising an electrical component;
a load device; and
a cable assembly interconnecting the source device and the load device, the cable assembly comprising:
a conductive core electrically interconnecting the electrical component and the load device;
a conductive shield surrounding and being electrically insulated from the conductive core, the conductive shield having a first conductive portion and a second conductive portion separated by a gap;
an outer insulating layer surrounding the conductive shield, the outer insulating layer having a first insulating portion surrounding the first conductive portion and a second insulating portion surrounding the second conductive portion, wherein the first insulating portion and the second insulating portion are separated by the gap; and
an insulating body positioned in the gap between the first and second conductive portions and between the first and second insulating portions such that the first and second conductive portions are electrically separated.

2. The vehicular electrical system of claim 1, wherein the cable assembly further comprises a first insulating layer positioned between the conductive core and the conductive shield.

3. The vehicular electrical system of claim 2, wherein the conductive shield is in direct contact with the first insulating layer, and wherein the insulating body is in direct contact with the first insulating layer.

4. The vehicular electrical system of claim 3, wherein the insulating body has an inner body diameter and an outer body diameter, wherein the conductive shield has an inner diameter equal to the inner body diameter, and wherein the outer insulating layer has an outer diameter equal to the outer body diameter.

5. The vehicular electrical system of claim 1 wherein the first insulating portion ends at a first surface, wherein the second insulating portion ends at a second surface parallel to the first surface, and wherein the first surface and second surface bound the gap.

6. The vehicular electrical system of claim 1, wherein the cable assembly further comprises a first insulating layer positioned between and in contact with the conductive core and the conductive shield.

7. The vehicular electrical system of claim 1, wherein the first portion of the conductive shield has an inner surface facing the conductive core and terminates at an end, wherein the second portion of the conductive shield has an inner surface facing the conductive core and terminates at an end, and wherein the insulating body contacts the end of the first portion of the conductive shield and the end of the second portion of the conducive shield.

8. The vehicular electrical system of claim 1, wherein the conductive shield has an outer surface and wherein the insulating body extends radially outward to the outer surface.

9. The vehicular electrical system of claim 1 wherein the conductive shield has an outer surface and wherein the insulating body extends radially beyond the outer surface.

10. The vehicular electrical system of claim 1, further comprising a conductive frame interconnecting the source device and the load device.

11. An automotive electrical system comprising:
a source device comprising a plurality of power switching components;
a load device; and
a plurality of cable assemblies interconnecting the source device and the load device, each of the plurality of cable assemblies comprising:

a conductive core electrically interconnecting at least one of the power switching components and the load device;

a conductive shield surrounding the conductive core, the conductive shield having a first portion and a second portion;

an outer insulating layer surrounding the conductive shield, the outer insulating layer having a first portion around the first portion of the conductive shield and a second portion around the second portion of the conductive shield;

an insulating layer surrounding the conductive core and being positioned between the conductive core and the conductive shield such that the conductive shield is electrically insulated from the conductive core; and an insulating body positioned between the first and second portions of the outer insulating layer and between the first and second portions of the conductive shield such that the first and second portions of the conductive shield are electrically separated, wherein the insulating body is in direct contact with the first portion of the outer insulating layer, the second portion of the outer insulating layer, the first portion of the conductive shield, the second portion of the conductive shield, and with the insulating layer.

12. The automotive electrical system of claim 11 wherein:
the conductive core has a radially outer surface;
the insulating layer contacts the radially outer surface of the conductive core;
the insulating layer has a radially outer surface;
the conductive shield contacts the radially outer surface of the first insulating layer;
the conductive shield has a radially outer surface; and
the outer insulating layer contacts the radially outer surface of the conductive shield.

13. The automotive electrical system of claim 12, wherein the outer insulating layer has an outer surface, and wherein the insulating body extends radially outward from the radially outer surface of the insulating layer to the outer surface of the outer insulating layer.

14. The automotive electrical system of claim 11, wherein the first portion of the conductive shield terminates at an end, wherein the second portion of the conductive shield terminates at an end, and wherein the insulating body contacts the end of the first portion of the conductive shield and the end of the second portion of the conductive shield.

15. The automotive electrical system of claim 11 wherein the conductive shield has an outer surface and wherein the insulating body extends radially beyond the outer surface.

16. A vehicular electrical system comprising:
a source device comprising an electrical component;
a load device; and
a cable assembly interconnecting the source device and the load device, the cable assembly comprising:
    a conductive core electrically interconnecting the electrical component and the load device;
    a first insulating layer surrounding the conductive core;
    a conductive shield surrounding the first insulating layer, the conductive shield having a first conductive portion and a second conductive portion separated by a gap;
    an insulating body positioned in the gap between the first and second conductive portions of the conductive shield and on the first insulating layer; and
    an outer insulating layer surrounding the conductive shield and contacting the insulating body.

17. The vehicular electrical system of claim 16 wherein the gap is bounded by an end surface of the first conductive portion, an end surface of the second conductive portion, and an outer surface of the first insulating layer extending; and wherein the insulating body contacts each end surface and the outer surface.

18. The vehicular electrical system of claim 16 wherein:
the conductive core has a radially outer surface;
the first insulating layer contacts the radially outer surface of the conductive core;
the first insulating layer has a radially outer surface;
the conductive shield contacts the radially outer surface of the first insulating layer;
the conductive shield has a radially outer surface; and
the outer insulating layer contacts the radially outer surface of the conductive shield.

19. The vehicular electrical system of claim 18 wherein the insulating body contacts the radially outer surface of the conductive shield.

20. The vehicular electrical system of claim 16 wherein the insulating body has an inner body diameter and an outer body diameter, wherein the conductive shield has an inner diameter equal to the inner body diameter, and wherein the outer insulating layer has an outer diameter equal to the outer body diameter.

* * * * *